Jan. 8, 1946. L. E. ZERBE 2,392,714
LOCK WASHER
Filed Oct. 27, 1943
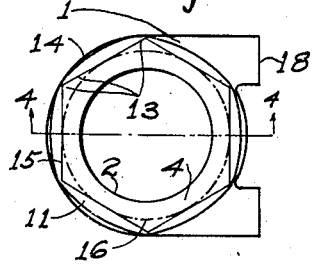
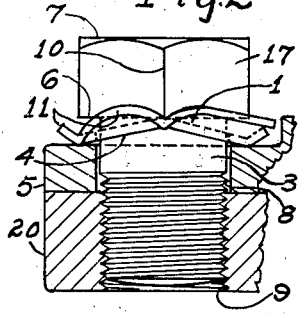
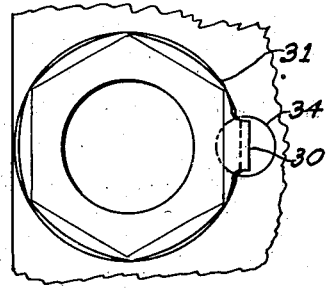
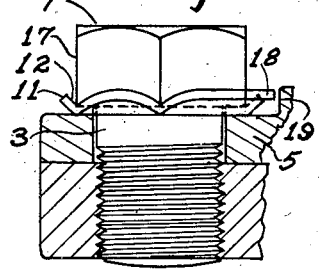
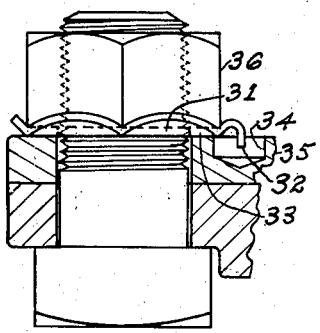
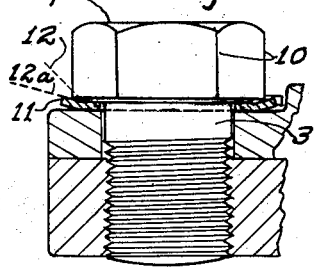
INVENTOR
Lewis E. Zerbe.

Patented Jan. 8, 1946

2,392,714

UNITED STATES PATENT OFFICE 2,392,714

LOCK WASHER

Lewis E. Zerbe, Los Angeles, Calif.

Application October 27, 1943, Serial No. 507,787

4 Claims. (Cl. 151—32)

My invention relates to lock washers of various sizes for permanently retaining screws or bolts with heads having cornered cross sections or nuts having a cornered cross section, in the position in which they may be set or tightened, or to permit their removal or replacement a reasonable number of times without injury to any of the associated members, regular standard screws or bolts, or nuts, of various sizes in common use may be used without in any way changing their construction.

Another object of my invention is to produce my lock washers with various means of securing the lock washers against axial rotation with respect to the clamped member.

Other objects and advantages will be more fully apparent from the following description of the accompanying drawing which forms a part of this disclosure, and which illustrate preferred forms of my invention.

I attain these objects by producing my lock washers of thin specially resilient alloy spring steel, scientifically heat treated, and by constructing the lock washers with an annular body portion, having a central screw hole, the outer diameter being divided into six equally spaced lobes, all bent upwardly and outwardly to a predetermined angle, the bottom thus formed having a hexagon shaped outline to fit the hexagon head of a cap screw, when the screw is in the tightened position, the said lobes being directly in the path of the corners of the screw head when the screw is rotated, thus the lobes must be pressed down to allow the corners to pass, one of each of the lobes interfering with one of each of the corners in passing, the object being to provide the greatest number of pressure points possible simultaneously, the combined pressure forces being equal to or greater than the force required to unassistedly rotate the screw, this causes the least pressure on the corners of the screw head, thus reducing the wear and shear on the corners to a minimum and providing the greatest locking and wearing efficiency possible for both the washer and the screw, various means to prevent rotation of the washer in respect to the clamped member being provided and hereinafter described.

My invention is illustrated in the accompanying drawing in which:

Fig. 1 is a plan view of a preferred type of my lock washer showing the annular body having projections to prevent axial rotation of the lock washer in relation to the clamped member.

Fig. 2 is an elevational view of Fig. 1 showing the lock washer assembled with conventional associated members, the screw head is shown in its position at the moment of making contact with the lock washer.

Fig. 3 is an elevational view of Fig. 1 showing the lock washer assembled with conventional associated members, the lock washer body is shown pressed solidly flat between the screw head and the clamped member, the screw head being in the set or tightened position.

Fig. 4 is an elevational view of Fig. 1 in section through the lock washer on the line 4—4 showing the lock washer body pressed flat on the clamped member and the upwardly extending resilient lobes on the lock washer are pressed down to allow the corners of the screw head to pass.

Fig. 5 is a plan view of the lock washer similar to that in Fig. 1 except that a modified type of projection to prevent axial rotation of the lock washer in relation to the clamped member, is shown.

Fig. 6 is an elevational view of Fig. 5 showing the lock washer assembled with conventional associated members, pressed solidly flat between the nut and the clamped member, the nut being in the set or tightened position.

Referring to the drawing, the lock washer 1 Fig. 2 is shown in place on the clamped member 5, which rests on the supporting member 20, the body of the screw 3 passes freely through the holes in the washer 1 and the clamped member 5, the threaded end 8 of the screw is screwed into the threaded hole 9 in the supporting member 20, until the shoulder 6 on the screw head 7 lightly contacts the upper side of the up-bent bottom 4 of the washer at the moment when the corners 10 on the screw head 7 make contact with the upwardly extending lobes 11 on the washer, continued rotating and tightening of the screw causes each of the corners 10 Fig. 4 of the screw head 7 to intermittently encounter each of the resilient upwardly extending lobes 11 Fig. 3 and force them downwardly to the line 12a Fig. 4 to allow the corners 10 to pass, the lobes 11 then immediately flexibly react to resume their upwardly extending position to the line 12, force is required to rotate the screw 3 while the corners 10 are in interference with the lobes 11, this force is greater than the force which causes the screw 3 to become loose and unscrew, rotating and tightening of the screw 3 Fig. 3 being continued until the clamped member 5 is clamped with the required tightness, the screw 3 is thus securely retained in the set or tightened position because the corners 10 Fig. 4 of the screw head 7 must be forced to pass the lobes 11 before the screw can be freely rotated, the bottom wall 4 Fig. 1 of the lock washer having a hexagon shaped impression 13 caused by the lobes 11 being bent upwardly, around the outer diameter 14 to the angle 12 Fig. 3 the bends being made on the chord lines 15 Fig. 1 tangent to the circle 16, the said circle 16 has a diameter equal to the distance across the flat sides 17 Fig. 3 of the screw head 7, the outer diameter 14 Fig. 1 is slightly larger than the distance across the corners 10 Fig. 4 of the screw head 7, projections 18 Figs. 1 and 3 hold the lock washer stationary when in contact with shoulder 19 Fig. 3 on the clamped member 5 when the screw head 7 is being rotated.

30 Fig. 5 shows a narrow strip projecting beyond the outer diameter of the lock washer 31 and bent vertically to a point 32 Fig. 6 below the bottom 33 of the lock washer 31 and entering the hole 34 in the clamped member 35 to prevent axial rotation of the lock washer, the nut 36 is shown in the set or tightened position.

Various changes may be made in the principles of my invention without departing from the spirit thereof as set forth in the description, drawing and claims.

I claim:

1. A lock washer for use with a hexagon head cap screw and associated members, formed from resilient sheet metal, having an annular body portion with a central screw hole, with equally spaced resilient exterior lobes extending upwardly and outwardly at a predetermined angle, the number of said lobes being equal to the number of corners on the screw head, the said lobes being directly in the path of the corners on the screw head when the screw is rotated, to produce a maximum of resistance to the rotation of the screw with a minimum of force being simultaneously applied to one of each of the corners of the screw head by one of each of the said resilient lobes on the washer, two of the said lobes being elongated and bent over at the tops to extend outwardly on a plane parallel with the bottom of the washer to form stops to prevent axial rotation of the lock washer, when said stops abut a shouldered portion on one of the said associated members.

2. A lock washer for use with a hexagon head cap screw and associated members, formed from resilient sheet metal, having an annular body portion with a central screw hole, with equally spaced resilient exterior lobes extending upwardly and outwardly at a predetermined angle, the number of said lobes being equal to the number of corners on the screw head, the said lobes being directly in the path of the corners on the screw head when the screw is rotated, to produce a maximum of resistance to the rotation of the screw with a minimum of force being simultaneously applied to one of each of the corners of the screw head by one of each of the said resilient lobes on the washer, one of the said lobes having a lateral extension beyond the annular body portion, the said extension being bent downwardly to extend below the bottom of the lock washer, into rotation resisting relation to one of said associated members.

3. A lock washer for use with a hexagon head of a screw used with associated members, one of which has a shouldered portion, the said lock washer being formed from a circular piece of sheet metal without slits or penetrating teeth, with a central screw hole through the flat bottom and surrounded by six equally spaced resilient lobes, each lobe being bent upwardly and outwardly on a line tangent to a circle having a diameter equal to the distance across the flats of the said screw head, the said lobes being directly in the path of the corners on the screw head when the screw is rotated, to produce a maximum of intermittent resistance to the rotation of the screw with a minimum of force simultaneously applied to one of each of the corners of the screw head by one of each of the said resilient lobes on the washer, the body portion of the said lock washer being tightly clamped to the clamped member by the screw head, when the screw is in the tightened position, two of the said lobes being elongated and bent over at the tops to extend outwardly on a plane parallel with the bottom of the washer, to form stops to prevent axial rotation of the lock washer, when the said stops abut said shouldered portion of one of the said associated members.

4. A lock washer for use with the hexagon head of a screw used with associated members, the said lock washer being formed from a circular piece of sheet metal without slits or penetrating teeth, with a central screw hole through the flat bottom and surrounded by six equally spaced resilient lobes, each lobe being bent upwardly and outwardly on a line tangent to a circle having a diameter equal to the distance across the flats of the said screw head, the said lobes being directly in the path of the corners on the screw head when the screw is rotated, to produce the maximum of intermittent resistance to the rotation of the screw with a minimum of force simultaneously applied to one of each of the corners of the screw head by one of each of the said resilient lobes on the washer, the body portion of the said lock washer being tightly clamped to the clamped member by the screw head, when the screw is in the tightened position, one of the said lobes having a lateral extension beyond the annular body portion, the said extension being bent downwardly to extend below the bottom of the lock washer, into rotation resisting relation to one of the said associated members.

LEWIS E. ZERBE.